(12) United States Patent
Körling et al.

(10) Patent No.: US 7,450,591 B2
(45) Date of Patent: Nov. 11, 2008

(54) SYSTEM FOR PROVIDING FLEXIBLE CHARGING IN A NETWORK

(75) Inventors: Martin Körling, Sollentuna (SE); Magnus Harnesk, Åkersberga (SE); Jan Lemark, Stockholm (SE); Tormod Hegdahl, Oslo (NO)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 574 days.

(21) Appl. No.: 10/531,021

(22) PCT Filed: Jun. 27, 2003

(86) PCT No.: PCT/SE03/01122

§ 371 (c)(1),
(2), (4) Date: Apr. 12, 2005

(87) PCT Pub. No.: WO2004/036825

PCT Pub. Date: Apr. 29, 2004

(65) Prior Publication Data

US 2006/0008063 A1    Jan. 12, 2006

(51) Int. Cl.
*H04L 12/28* (2006.01)
(52) U.S. Cl. .............................. 370/395.43; 370/395.21
(58) Field of Classification Search ................... 370/352
See application file for complete search history.

(56) References Cited

U.S. PATENT DOCUMENTS

| 7,284,047 B2 * | 10/2007 | Barham et al. ............... 709/224 |
| 2002/0075813 A1 * | 6/2002 | Baldonado et al. .......... 370/254 |
| 2003/0086413 A1 * | 5/2003 | Tartarelli et al. ............. 370/352 |
| 2003/0152084 A1 * | 8/2003 | Lee et al. ............... 370/395.21 |
| 2006/0050711 A1 * | 3/2006 | Lialiamou et al. ........ 370/395.2 |

FOREIGN PATENT DOCUMENTS

| WO | WO 0117222 A1 | 3/2001 |
| WO | WO 0201847 A1 | 1/2002 |

* cited by examiner

*Primary Examiner*—Creighton H Smith (57) ABSTRACT

The present invention relates to arrangements for charging in a packet switched network. Packets are charged differently dependent on which service flow the packets belong to. The charging system comprises a control system and a serving element residing in a packet forwarding system wherein said control system comprises an account function adapted to manage an account of at least one user and a charging policy decision point arranged to calculate a charging policy for allowed services for the at least one user. Moreover, said serving element comprises a token bucket per user adapted to store reservations received from the account function of the user associated with the token bucket and a charging policy enforcement point arranged to perform charging for a plurality of the allowed services by reducing the stored reservation of the token bucket according to the calculated charging policy.

27 Claims, 6 Drawing Sheets

User Rating Table 401

| Service Class | 14 | 15 | 22 | 60 |
|---|---|---|---|---|
| Initial rate values | -60 | 0 | -50 | -40 |
| Current rate values, up | -3 | 0 | 0 | -4 |
| Current rate values, down | -3 | 0 | -2 | -4 |
| Next rate values, up | -2 | 0 | 0 | -3 |
| Next rate values, down | -2 | 0 | -1 | -3 |
| Remaining volume | 1.35 | ... | ... | ... |

Validity Conditions 402

| Remaining time | 0:53:30 |
|---|---|
| Time for current rate | 14:00:00 |
| Time for next rate | 18:00:00 |
| Location | ... |

User Profile

- MSISDN
- User Service Class Vector
  (list of allowed Service Classes)

| 14 | 15 | 22 | 60 |
|---|---|---|---|

- other data

Fig. 5

Tariff plan

| Service Class | Tariffs | | | |
|---|---|---|---|---|
| | home | roaming | after 6pm | after 3MB | after 30min |
| 14 | 0 | -1 | 0 | 0 | 0 |
| 15 | -2 | -2 | -2 | -2 | -2 |
| 22 | 0 | -1 | 0 | 0 | 0 |
| 52 | -1 | -1 | -1 | -1 | -1 |
| 60 | -3 | -4 | -2 | -2 | -2 |

Service Filters

| Service Identifier | filter rule | | | | | | | | |
|---|---|---|---|---|---|---|---|---|---|
| | filter prio | IP address/mask | TCP/UDP | port# | protocol# | ICMP type | protocol | PIF pointer | Service Class |
| 1 | 1 | 100.18.0.0/16 | * | - | - | - | WSP | 1 | - |
| 2 | 2 | 100.18.0.0/16 | * | - | - | - | HTTP | 2 | - |
| 3 | 3 | 100.12.0.0 | * | - | - | - | - | - | 22 |
| 4 | 4 | * | - | - | - | - | - | - | 60 |

Fig. 7b

Protocol Inspection Filter (PIF) configuration

| PIF# | Identifier | Service Class |
|---|---|---|
| 1 | mms1.oper.net | 14 |
| 1 | mms2.oper.net | 14 |
| 1 | * | 15 |
| 2 | music.com | 52 |
| 2 | * | 53 |

Figure 8

SYSTEM FOR PROVIDING FLEXIBLE CHARGING IN A NETWORK

FIELD OF THE INVENTION

The present invention relates to packet switched communications systems, and more particularly, to arrangements for performing charging in real time.

BACKGROUND OF THE INVENTION

Packet switched communications systems transport many different types of telecommunications traffic, such as voice, data, and multimedia traffic, which originates from a large variety of applications. A network operator may provide a variety of services that uses the different types of traffic and having a variety of charging schemes.

For some services, e.g. streaming, it is suitable to apply a time-based charging in contrast to other services e.g. internet browsing, where volume related charging is the only possible (usage related) charging method. The choice between time-based, volume-based and service based charging is made in relation to what the subscribers are willing to pay for and also to achieve an accepted understandable charging method. E.g., for a streaming application such as a video stream, it is understandable for the user to pay for consumed time that he has watched the video.

A subscription may have one or more users. The subscription is either a pre-paid or a post-paid subscription, which implies that the subscriber, either in the pre-paid case pays an amount in advance, i.e. prior the service(s) is (are) utilised or in the post-paid case pays for e.g. the time or data volume that he actually has used during a certain period of time. In order to support pre-paid subscriptions, the charging solution has to have "real-time" properties. This is particularly important when a prepaid subscriber's credit account is empty, service execution (in this case packet forwarding) must be immediately affected. When a subscriber account is empty, the operator wants to block at least all services that are subject for charging, since the operator wants to have credit control in addition to prevent loosing money because of non-payment for consumed services. Some free of charge services may still be open for the subscriber like refill of the account, call to emergency numbers, self-care pages and in some cases also reception of SMS/MMS messages.

Thus, it is desirable to be able to perform a differentiated rating on the packet level based on the service. Performing differentiated rating on the packet level raises however a fundamental challenge, since rating is a complex process involving many input parameters such as tariff plan, time and volume thresholds, subscriber profile, etc., while the packet forwarding should be executed with lowest possible latency. Thus, packet forwarding systems and rating engines, respectively, have different system requirements.

Herein, the charging system according to prior art is called a "multiple token bucket" system. Such a system comprises a control system and a packet forwarding system as disclosed in FIG. 1. The control system 101 comprises a rating engine 102 and credit accounts 103. The packet forwarding system 104 comprises one token bucket 105 per service flow 106 and user which results in multiple token buckets 105 for every logged-in user provided that multiple services are used.

Figure 1:
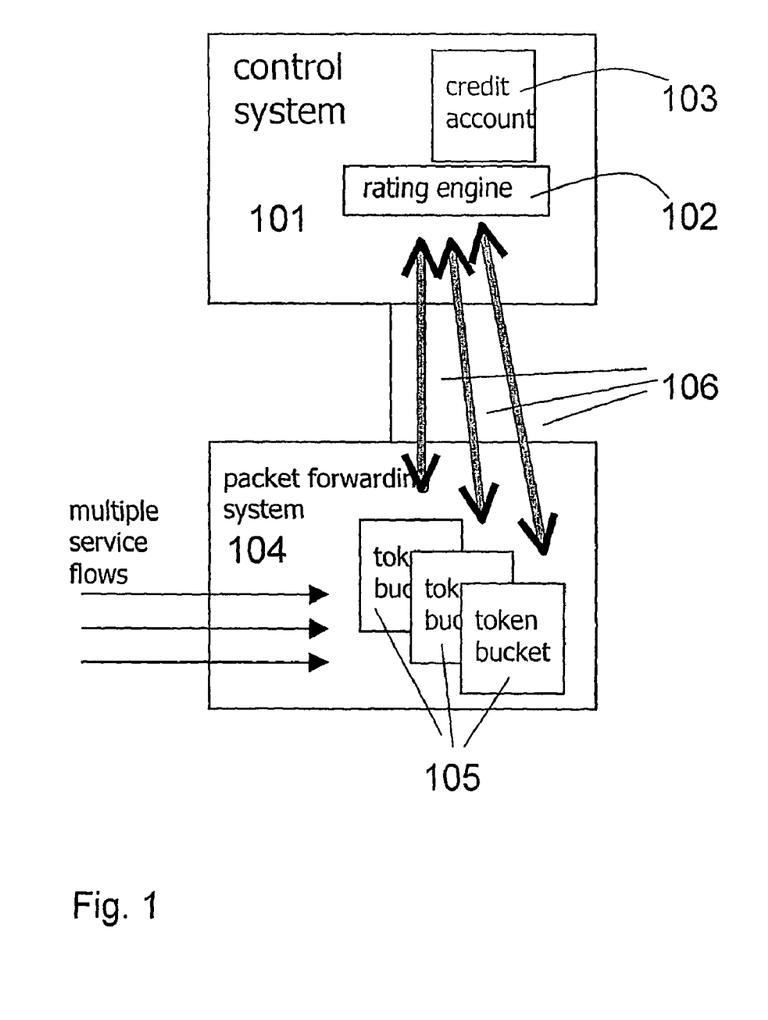
FIG. 1 is a schematic block diagram illustrating the multiple token bucket solution according to prior art.

When a user logs into the communication system, the packet forwarding system 104 initiates a control signalling sequence to the control system 101 for each service. The control system 101 reserves a preconfigured amount of credit towards the subscriber's credit account, wherein this amount is called a "credit reservation". The control system 101 determines the set of services this user is allowed to use. The set of identifiers for these allowed services are sent to the packet forwarding system. For each service identifier, the packet forwarding system 104 initiates a resource reservation signalling sequence towards the control system. For each such sequence, the service is rated by the rating engine 102 of the control system 101, using a tariff plan. The rating value is used to translate parts of the credit reservation into a "resource reservation" (typically data volume related), which is sent back to the packet forwarding system 104. Each resource reservation is put into a specific resource token bucket 105. Thus, the packet forwarding system 104 contains multiple token buckets 105, one for each allowed service per user.

When traffic is flowing through the communication system the packet forwarding system 104 classifies each packet to determine which service flow it belongs to. Then the token bucket 105 for that service is decremented. When a token bucket 105 is empty, the usage is confirmed towards the control system and a new resource reservation is done.

Thus, the multiple token bucket solution that performs per-packet real-time charging in a packet switched communication system, wherein the packets are charged differently dependent on which service flow the packets belong to, requires a separate resource reservation signalling sequence for each service flow in the set of allowed services. This creates a large amount of signalling traffic between the control system and the packet forwarding system. In addition, it requires high processing capabilities in the control and the packet forwarding system, respectively, and high capacity transport between said systems.

Furthermore, the multiple token bucket solution have other drawbacks since unnecessary reservations are performed. In the multiple token bucket case, a pre-configured amount of resources is reserved for each service, wherein the credit reservation of each token bucket is dedicated for a specific service flow. That implies that credit reservations made for services not being used cannot be utilised for another service that actually is being used. Thus, this results in the above unnecessary reservations. Moreover, the problem gets worse as the number of services increases.

Another possible solution is to use several GPRS Access points Names (APN) in a mobile telecommunication network for differentiating between different consumer service flows. An APN is a label of one or more service flows in a mobile cellular network. However, this solution has disadvantages due to APN configuration management, in e.g. terminal and network, as well as IP address handling in the terminal. Thus, this solution requires additional management for the operator to setup and control.

Network operators prefer hence a solution with multiple services per APN, preferably one APN for all service flows.

SUMMARY OF THE INVENTION

As mentioned above, a multiple token bucket solution of prior art requires a large amount of signalling traffic between the control system and the packet forwarding system. In addition, the multiple token bucket solution is in many cases subject to the above mentioned unnecessary reservations. Furthermore, it is desirable to achieve a solution where multiple service flows are connected to one Access Point Name (APN) in a mobile cellular network, since solutions with one service flow per APN has drawbacks relating to configuration management as explained above.

Therefore, a first object of the present invention is to achieve arrangements for providing a flexible realtime charging, whereby the signalling between the control system and the packet forwarding system is reduced.

A second object of the present invention is to prevent unnecessary reservations.

A third object with the present invention is to provide a charging system where service flows can be differentiated at packet level and applicable charging can be applied in a flexible way. I.e., each packet should be able to be charged differently dependent on which service flow the packets belong to.

A fourth object of the present invention is to achieve a solution facilitating multiple services per APN.

The above stated objects are achieved by means of a system according to claim 1, a control system according to claim 12, a serving element according to claim 18.

The charging system according to the present invention makes it possible to reduce signalling between the control system and the packet forwarding system. The charging system comprises a control system and a serving element residing in a packet forwarding system. Said control system comprises an account function adapted to manage an account of at least one user and a charging policy decision point arranged to calculate a charging policy for allowed services for the at least one user. Said serving element comprises a token bucket per user adapted to store reservations received from the account function of the user associated with the token bucket and a charging policy enforcement point arranged to perform charging for a plurality of the allowed services by reducing the stored reservation of the token bucket according to the calculated charging policy.

According to a first embodiment of the present invention the reduced risk for unnecessary reservations towards the account function is realized by having a single token bucket that is shared by a plurality of service flows per user.

Another advantage of the present invention is when a rate change should be performed at a certain time-of-day (ToD), the signalling load may be reduced by including, in the charging policy, the user rating table part, rates both before and after ToD. Furthermore, when a user credit account becomes empty or a predefined threshold is reached, it is possible to apply a fine-grained policy control of the traffic thanks to the charging policy.

Another advantage of the present invention is that the use of a single token bucket per subscriber concept reduces the distribution of token reservations in the network which hence reduces the risk to empty the prepaid account due to many different reservations. It also reduces the control signalling between the serving element and the gateway and eventually the pre-paid system, thus reducing the needs of physical boxes for all three functions.

Another advantage of the present invention is that the service class concept allows the operator to group related services into a number of groups, i.e. the services having identical tariffs in one group. Thus, the relation between the services in the same service class could be arbitrary except that the tariff must be the same since the rating is based on the service class. Still, each user could have different tariffs for a particular service class, but for a particular user, all services in a service class will have the same rating (at a particular time) which means that all packets belonging to a certain service class are rated in accordance with the rating value associated with that service class in real-time without need for control signalling towards the rating engine. The benefit besides the service grouping is that the amount of data per subscriber is dramatically reduced. As an example, the number of services may be in the order of thousands but the number of service classes may be up to hundred. The service class concept is also the basis for operator-side service authorisation. In addition, the service class concept reduces the complexity for the user (the charging scheme for different services may be easier to understand), speeds up the processing of the charging system e.g. since the size of the user rating tables decreases.

Another advantage with the present invention is that the delay when starting to use a service (for example when retrieving MMS messages) is reduced which results in a better end-user satisfaction and higher data throughput. That is achieved due to the dynamic pre-rating at subscriber connection which implies that all applicable rating values including their validity conditions are calculated before the subscriber starts to use the different services. It also reduces the control signalling traffic thus reducing the load of the rating engine. Both traffic data throughput enhancement and control signalling traffic reduction may lead to fewer physical boxes in the network. A high level of rating flexibility is maintained as the rating values have well-specified validity and may be re-newed.

A further advantage of the present invention is that the service filter and the protocol inspection filter (PIF) concepts allow the operator to specify filter rules for a service that may increase the traffic data throughput by just assigning rules in the service filter, while still having the possibilities to invoke more advanced filter rules when necessary to distinguish the service. Thus, the PIFs are only used if it is not possible to differentiate between the service flows by means of the service filter, i.e. by using the IP address, which results in a higher throughput at the packet forwarding system. The concepts as such are general which allow for further inclusion of new rules when needed for other services.

A further advantage of the present invention is that the charging system is arranged to handle "one-time initial charge". An initial amount of tokens are decremented from the token bucket before or during the start of the service.

Further advantages and objects of embodiments of the present invention will become apparent when reading the following detailed description in conjunction with the drawings.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The realtime charging system in accordance with the present invention may be implemented in an IP-network such as the Internet or in a packet switched mobile telecommunication network such as a GPRS-, UMTS- or a cdma2000 system. Even if the embodiments of the present invention are disclosed in connection with a GPRS-/UMTS system, the invention is not limited to such systems.

Figure 2:
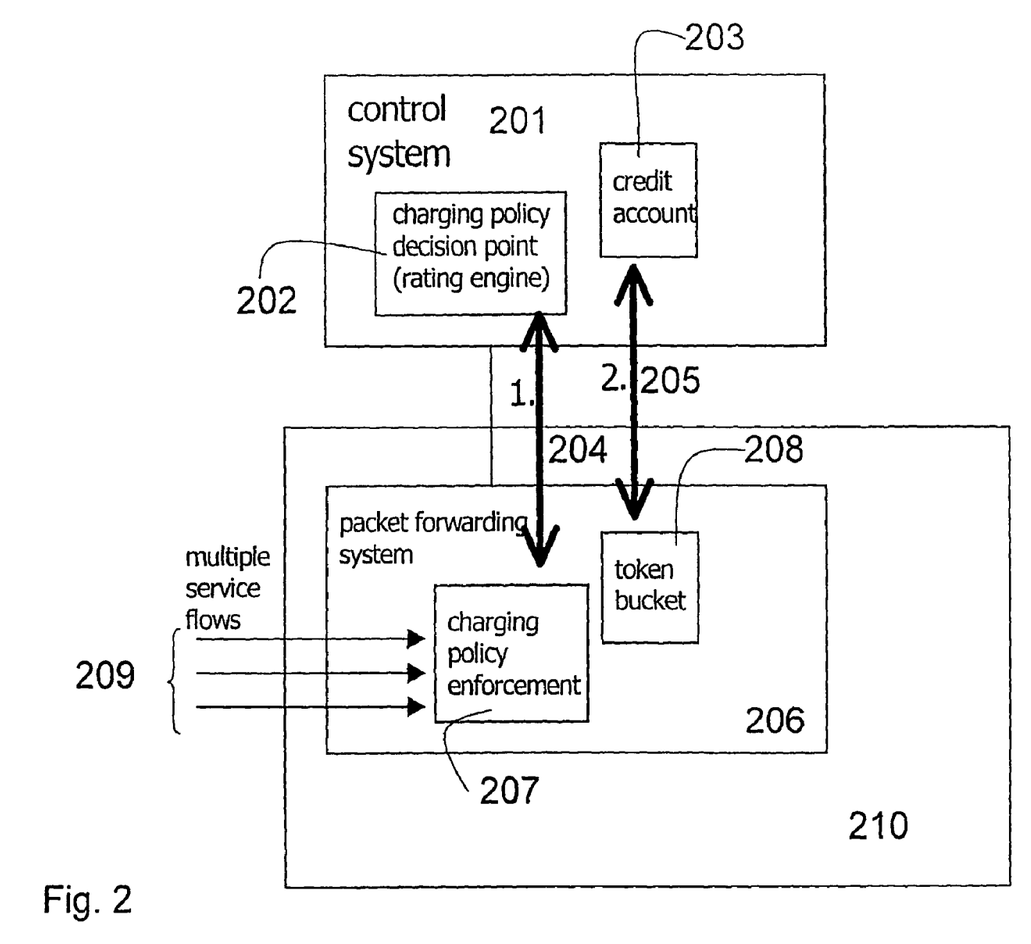
FIG. 2 is a schematic block diagram illustrating a single token bucket solution according to one embodiment of the present invention.

A proposed solution of a charging system according to embodiments of the present invention shown in FIG. 2 comprises a control system 201 and a serving element 206. The control system 201 comprises a charging policy decision point 202, also referred to as a rating engine, and a credit account function 203, which manages the users' credit accounts for real-time charging purposes. The serving element 206 comprises a charging policy enforcement point 207 for performing the charging, i.e. managing the reduction of the token bucket 208. The token bucket in the serving element is used per logged-in user and for a plurality of services. Preferably, one single token bucket is used for all services per logged in user. In addition, the serving element comprises means for differentiating packets based on which service flow they belong to. The serving element may reside in a packet forwarding system such as a switch, a router, a proxy, a GPRS Gateway Support Node (GGSN) node in the GPRS/UMTS system, or a PDSN node or Home Agent in the cdma2000 system.

The system of the present invention, comprises means for collecting all credit reservations for a plurality of services in one single token bucket per user in the serving element in the packet forwarding system. The credit account function transmits information of the amount of credit that should be reserved for all the services respectively, i.e. the services included in a user service vector which is further explained below, to the token bucket of the serving element for a specific user. The credit amounts are reserved in accordance with pre-configured settings performed by the network operator. The collection of all credit reservations for a plurality of services, preferably all, in one single token bucket is made possible thanks to that a charging policy for the services is calculated in accordance with the present invention by the control system and transmitted to the serving element. The calculation of the charging policy is herein referred to as dynamic pre-rating and is further explained below.

The present invention is applicable on realtime charging for both pre-paid and post-paid subscriptions. In the post-paid case, a token bucket may have a negative value, while in the pre-paid case, the token bucket is not allowed to have a negative value since the user is not allowed to use more credits than what is reserved. Moreover, the present invention is also applicable on both volume-based, time-based and service-based charging, dependent on settings of the serving element.

EXAMPLE 1

When a user logs on to a communication system comprising the charging system of the present invention, the serving element initiates a control signalling sequence between the serving element and the control system.

Figure 3:
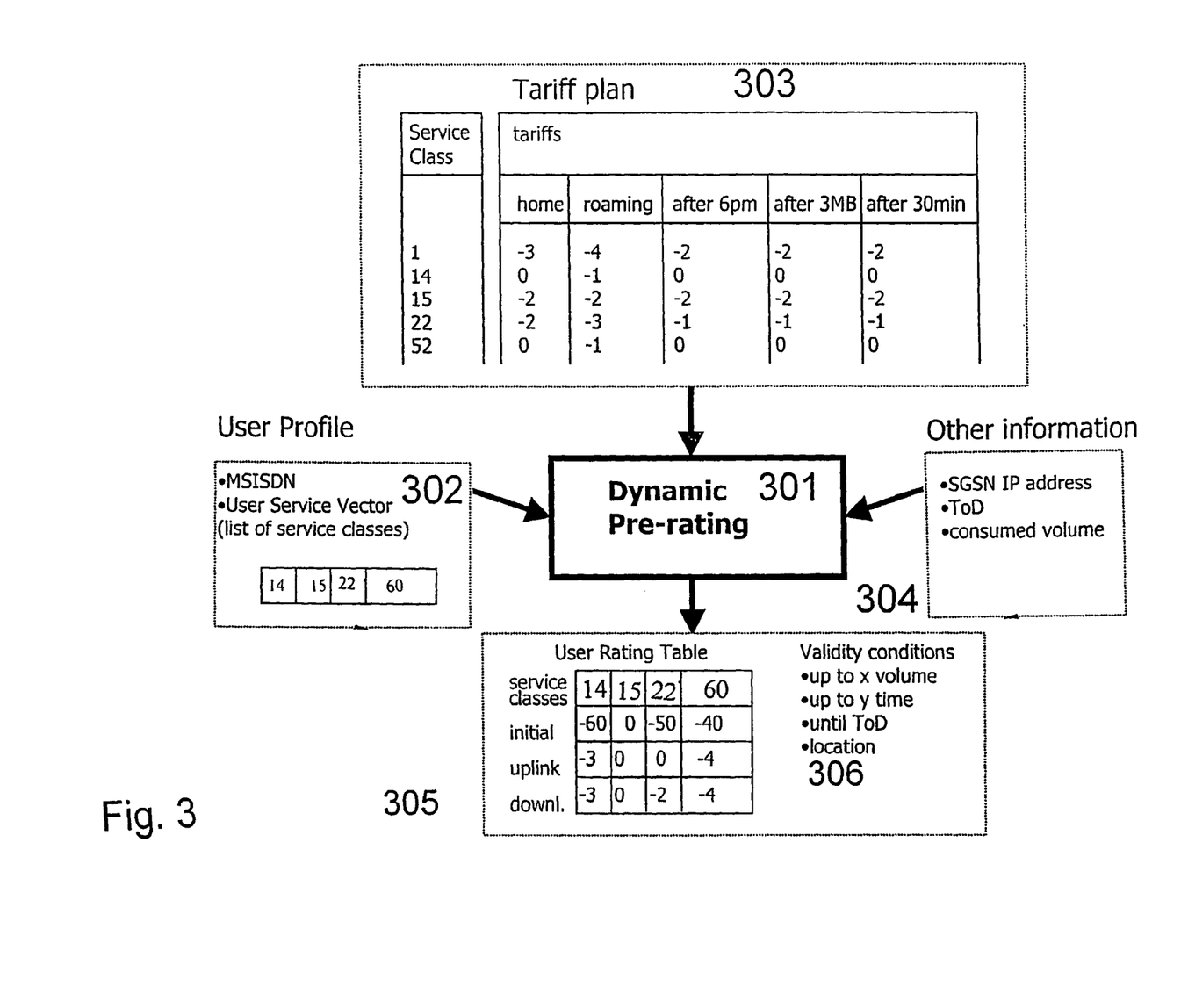
FIG. 3 is a schematic block diagram illustrating a process of calculating the "charging policy" in accordance with the present invention.

The control system determines the set of service identifiers this user is allowed to use. The rating engine 301 of the control system calculates a charging policy 304 based on a tariff plan 303 and other input data e.g., Time of Day (ToD), the user's roaming status, the aggregated transferred data volume for the user and other user specific usage history. Current usage behaviour is also utilised at the calculation of the user rating table if the user already is logged on, e.g. in a situation when the token bucket of the user runs empty, i.e. one validity condition is not fulfilled, and the serving element requests a new user rating table from the control system. This calculation is illustrated in FIG. 3 and is called dynamic pre-rating. The charging policy comprises a user rating table 305 and a set of validity conditions 306. The user rating table 305 includes rating values for each service class the user is allowed to use and the set of validity conditions defines the conditions when the user rating table is valid. The service class concept is introduced according to the present invention to limit the size of the user rating table of the charging policy. The service class is a group of services with the common property that they have exactly the same charging pattern, i.e. identical tariff plans. The calculated charging policy is sent to the serving element in the packet forwarding system.

Next, the serving element in the packet forwarding system initiates a reservation signalling sequence towards the credit account function of the control system. The credit account function reserves an amount of credit according to pre-configuration settings towards the user's credit account, wherein the amount is called a credit reservation. The credit reservation is made for a plurality of service, preferably all services, and the overall credit reservation is sent to the serving element and put into the user-specific token bucket.

When traffic is flowing via the packet forwarding system, the serving element in the packet forwarding system comprises means for classifying each packet to determine which service class it belongs to. The received calculated charging policy is used to determine the credit amount that should be decremented from the token bucket. It should be noted that the decrement may also be negative in order to support bonus services, i.e. a user gets paid if he uses a specific service.

The serving element in the packet forwarding system continuously checks if the validity conditions of the charging policy still are valid. Examples of validity conditions are time, thresholds for the token bucket, geographical area etc. When the validity conditions no longer are valid, a signalling sequence is initiated to get a new up-dated charging policy. When a rate change should be performed at a certain time-of-day (ToD), the charging policy, i.e. the user rating table part, contains the rate values that should be used both before and after ToD. That results in that the charging policy for a huge amount of users does not have to be updated at the same time which would cause extensive signalling during a short limited period of time for the huge amount of users, but the update may be performed during a longer period of time which reduces the signalling peak load.

Figure 4:
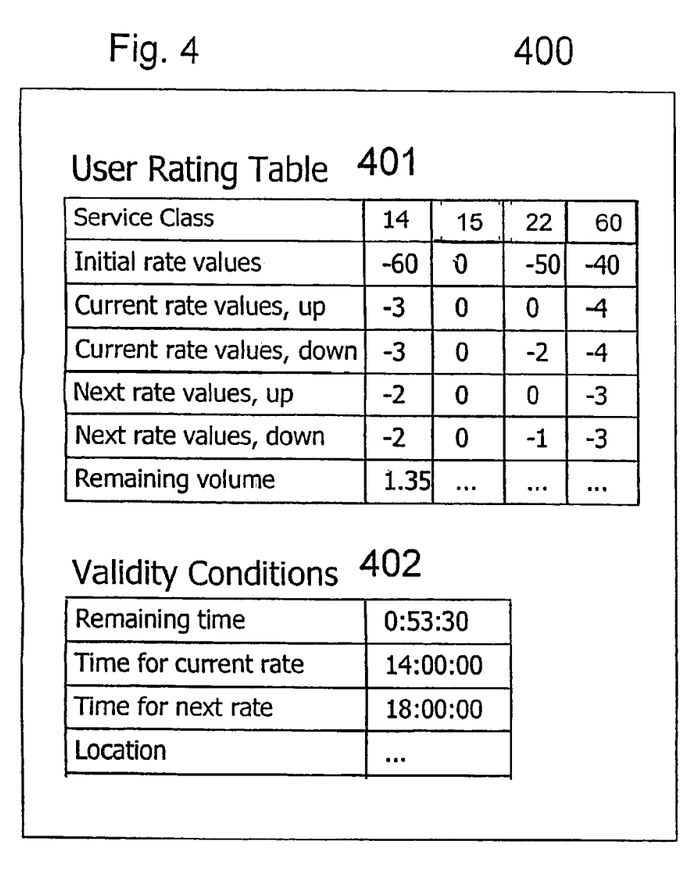
FIG. 4 illustrates the charging policy schematically, containing user rating table and validity conditions in accordance with the present invention.

FIG. 4 shows an example of a charging policy comprising a user rating table associated with validity conditions.

When a token bucket is empty or a predefined threshold is reached, the usage is confirmed towards the control system and a new resource reservation is done. In the confirmation signal, information about the usage of the different services may preferably be added explicitly.

Basic Terminology

In the following, the basic terminology of the flexible bearer charging system in accordance with the invention is explained:

A user is person having access to the operator's provided services.

One or more users may be connected to one subscription.

A subscriber is the owner of the subscription.

Realtime charging implies that the charging process is performed while or after the service has been requested. It should be noted that 3GPP uses the term "on-line charging".

A token is similar to a ticket. A utilisation of a service requires a predetermined amount of tickets/tokens, based e.g. on either the traffic volume or on the used time.

A token bucket is a place where all tokens for one user is collected.

A service, is the collection of all IP flows to and from a specific destination, determined by information in the headers or payloads of the IP packets.

A service identifier, is the unique identifier of a service.

Service class is an identifier of an arbitrary group of services that the operator wants to treat in the same way regarding e.g. charging and service authorization. One service is allowed to belong to only one service class at a time per user.

A tariff plan is a specification of prices for the services and when the services are valid.

A rating value is an amount that should be reduced from the token bucket for a specific service.

A service class according to the present invention comprises all services having identical tariff plans.

A service filter, is a specific filter setting that will handle a service with a specific service identifier. Thus, the service identifier is used to map the service to its service filter. This terminology is further described below. In each service filter, destination or/and source (depending on the traffic direction) IP addresses (and mask), TCP and UDP port numbers (ranges), and protocol numbers can be set. In order to handle inspection of higher protocol layers, a service filter may include a pointer to a Protocol Inspection Filter (PIF), which perform stateful packet inspection. The packet inspection is performed dynamically in contrast to the static service filters. That implies that the PIFs e.g. performs packet inspection based on previous events. The PIFs have specific configuration data (see FIG. 8b), for example containing URIs. Dynamic filters are established to perform the actual filtering for packets that fit to the defined PIF rules. Finally, service filters and PIF configuration lines contain the service class identifier that represents the result of a filter matching an incoming packet. The service class identifier identifies the service classes and hence determines the rating that will be applied to the packet. Service filter and PIF configurations are preferably performed in the packet forwarding system on a per Access Point Name (APN) basis.

PREFERRED EMBODIMENTS OF THE PRESENT INVENTION

Figure 8:
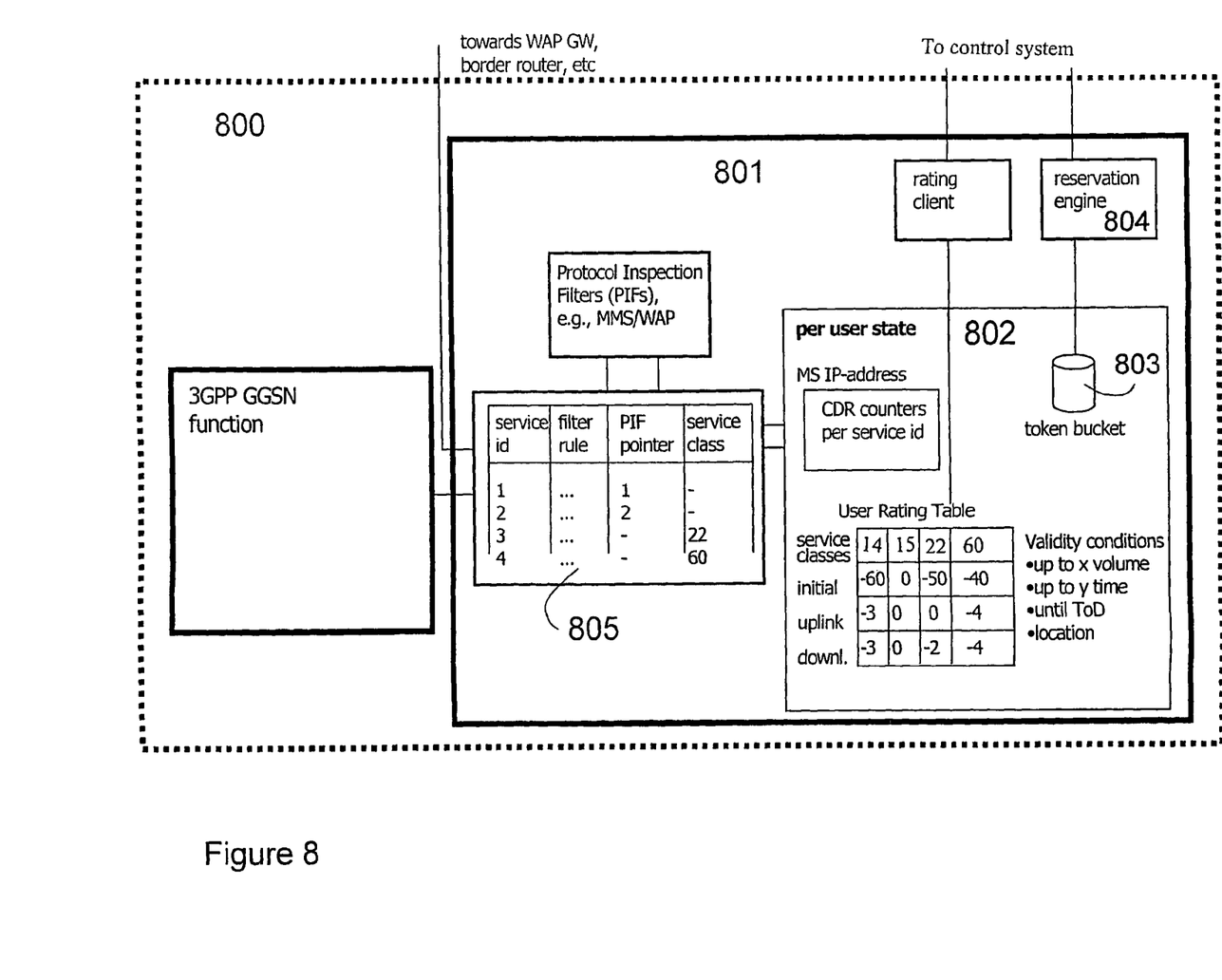
FIG. 8 illustrates the serving element in accordance to one embodiment of present invention implemented in a GGSN in mobile telecommunication system.

The charging system and method of the present invention will hereinafter be described in conjunction with a GPRS/UMTS system. Thus, one embodiment of the charging system implemented in a mobile telecommunication system such as GPRS or UMTS system according to the present invention comprises:

A serving element 801 located in a GGSN 800 as illustrated in FIG. 8. The serving element is further described below.

A control system comprising a rating engine in accordance with the present invention i.e. the charging decision point, which allows the operator to define services and tariff plans, and dynamically provides the serving element with rating information in form of charging policies. The control system comprises further a credit account function.

A gateway, which provides an integration point for interworking towards the operator's prepaid system by means of flexible interface options. In the case when the pre-paid system supports e.g. a Radius interface, the GGSN is arranged to directly interface to it.

It should be noted that even if the charging system and method thereof according to embodiments of the invention is described in conjunction with a GPRS/UMTS system in the following, the system and method thereof are not limited to such a system but may also be used in other packet switched communication systems.

Differentiated Packet Rating

As described above, differentiated rating on the packet level is a complex process involving many input parameters (tariff plan, time and volume thresholds, subscriber profile, etc), while packet forwarding should be executed with lowest possible latency.

The charging system of the present invention employs a rating process in two stages:

A dynamic pre-rating process providing the charging policy, which is performed by the rating engine of the present invention.

A real-time packet rating e.g. performed, in accordance with the provided charging policy, by the serving element in the GGSN.

The dynamic pre-rating process calculates a charging policy comprising a set of rating values for each service class that a subscriber is allowed to use. The charging policy comprises user rating table and a set of validity conditions. This calculation utilises the tariff plan and the current subscriber situation e.g. roaming status, time-of-day, etc. The rating values have a limited lifetime according to the set of validity conditions and have to be renewed for example when a tariff threshold is reached. The validity conditions may also relate to other parameters than the time. The dynamic pre-rating is performed and the charging policy is thus provided to the serving element before the user starts using any services.

The real-time packet rating is then performed by classifying a packet as belonging to a certain service class and using the already calculated rating values for that packet. This can be done with a very small delay in the forwarding process, since signalling between the control system and the serving element in forwarding system for each service initiation is avoided.

For example, a case is employment of zero volume-charge for services that have service-based charging (e.g., MMS). For such services, the dynamic pre-rating process would result in a rating value of zero. The real-time packet rating will then use the zero value and hence incurring no charge for that traffic.

Rating Engine

FIG. 3 illustrates how the rating engine of the preferred embodiment of the present invention performs the dynamic pre-rating process by producing a user rating table. The user rating table is produced by combining the user service class vector, the tariff plan, and additional information such as roaming status, aggregated volume and connect time stored in the database of the rating engine, time of day, and geographical location. In addition to the user rating table, a corresponding set of validity conditions are generated using tariff thresholds in order to produce the charging policy. The charging policy comprising the user rating table and the validity conditions is provided to serving element e.g. located in the GGSN.

More specifically, the rating engine comprises means for performing the following procedure:

- Accepts request for a user rating table; wherein the input of the request may be a user identifier, e.g. the MSISDN, SGSN IP-address, QoS of the PDP Context, etc.
- Receives the user service class vector of the subscriber which is further described below.
- Receives the service definition for each service class in that subscriber's user service class vector.
- Receives the aggregated volume, e.g. the transfer history, and aggregated connect time for this user (preferably stored in the internal database of the rating engine).
- Calculates roaming status based on SGSN IP address for each service class.
- Calculates the relevant rating values using the tariff plan and relevant rating dimensions, e.g., information about the user's roaming status, aggregated volume and connect time, ToD, and geographical location.
- Calculates the validity condition for these rating values using the tariff thresholds in the rating dimensions such as roaming status, aggregated volume and connect time stored in the data base of the rating engine, ToD, and geographical location
- Constructs the user rating table based on the above mentioned calculations.
- Sends the constructed user rating table and the calculated validity conditions in form of a charging policy according to the present invention to the charging enforcement point of the serving element in the packet forwarding system.

Serving Element

According to the present invention the serving element, residing in a packet forwarding system 800, comprises the charging enforcement point 802, means 805 for performing the service classification and one token bucket 803 per user handling a plurality of services, preferably all allowed available services. Thus, in the embodiment described above, the serving element is included in a GGSN 800. FIG. 8 shows an overview block diagram of the function of the serving element.

The service filter and PIF configurations are configured in the serving element. In a GPRS/UMTS network, that is preferably performed by using the operation and support system of the Core Network. The serving element is arranged to perform packet inspection according to the service filters. In some cases, when necessary, it also invokes Protocol Inspection Filters (PIFs) for analysis of higher-layer protocols.

For the pre-paid and post-paid subscribers, the serving element may utilize the dynamic pre-rating and the reservation mechanisms as described above. The serving element distinguishes between post-paid and pre-paid subscribers either by using the charging characteristics information or by analysis of the subscriber identity, e.g. the IMSI in case of a mobile cellular network. The serving element may be configured to retrieve the user service class vector for both pre-paid and post-paid subscribers in order to perform operator-side service authorization. Moreover, the serving element is arranged to perform credit control for both post-paid and pre-paid subscriptions.

The serving element requests user rating tables from the rating engine. This is triggered either at connection setup such as by PDP Context Activation or that the validity conditions for the user rating table are no longer valid. When a new user rating table is requested, the serving element reports to the rating engine the transferred volume and the connect time as well as the status of the "initial rate values".

The serving element comprises means 804 for making reservations towards prepaid and postpaid system, via a gateway, and thereby fills up each user's token bucket kept in the serving element of the packet forwarding system, e.g. the GGSN. The amount of reservation and the validity conditions are configurable in the serving element. It decrements each user's token bucket according to the user rating table.

Service Classification

The service classification is performed by means in the serving element in the packet forwarding system. In accordance with one embodiment of the present invention, the means for classifying packets are service filters and/or PIF. Thus, the classification is performed based on IP header information and/or higher-layer protocols. While the architecture of the system according to one embodiment of the invention supports general stateful inspection and identification of URIs, initial focus is put on detecting MMS traffic over WAP 1.x and 2.x. After a packet has been classified to belong to a certain service and service class, the real-time packet rating determines a rating value according to the calculated charging policy. The token bucket is then adjusted in accordance with the determined rating value.

The serving element in the packet forwarding system, preferably the GGSN, in accordance with the present invention is also adapted to enforce certain policies when the subscriber's prepaid account runs empty. Depending on roaming conditions, PDP Contexts can be de-activated or non-zero-rated packet can be stopped, while zero-rated traffic is let through e.g. allowing access to top-up pages, i.e. a default web page that the user enters when the credit account is empty. It may e.g. be possible to refill the account from such a top-up page.

The benefit for the network operator of this above mentioned two-stage approach is that if throughput and latency are most important, services such as email, instant messaging, traffic to corporate gateways, and traffic to Internet may be defined using only IP-header inspection at the service filter and the PIF is not required. However, for other services such as MMS over WAP, the IP-header inspection (i.e. service filter) is not sufficient. A more detailed inspection of the payload, in this case the URL/URI is required. Thus, this approach avoids the overhead of stateful packet inspection where it is not required. Thus, one of the basic ideas with the present invention is to start to use the service filter, and then only if necessary, continue with PIF.

EXAMPLE 2

Figure 7A:
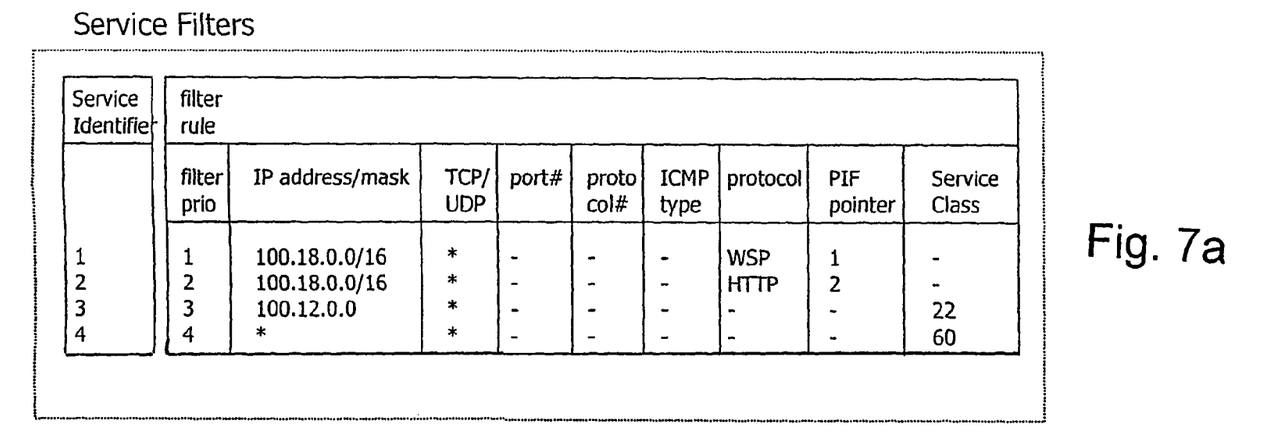
FIG. 7*a* illustrates the parameters of service filters.
Figure 7B:
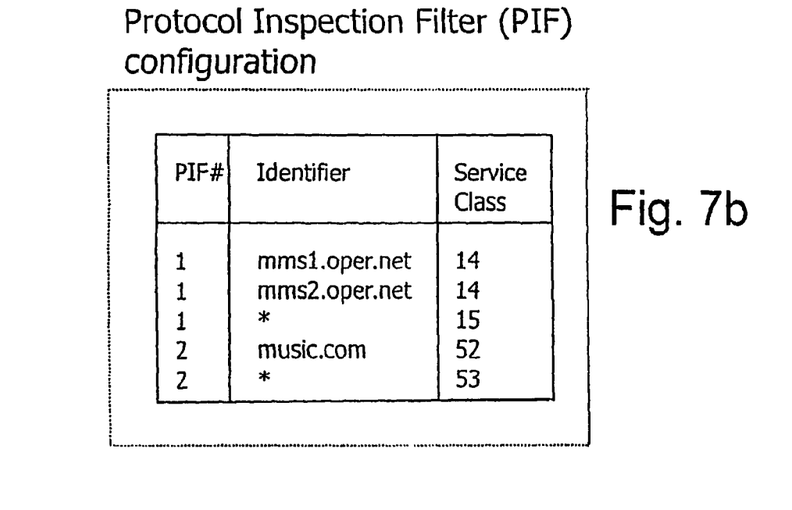
FIG. 7*b* illustrates the parameters of a Protocol Inspection Filter (PIF) configuration.

FIGS. 7*a* and 7*b* show an example where the operator's WAP gateways are placed at the subnet 100.18.0.0/16. Assume that these WAP gateways also are arranged to function as HTTP proxies. The service filters 1 and 2 both match packets to and from that subnet. Filter 1 is set to match the transport protocol Wireless Session Protocol (WSP) and invoke PIF number 1 according to the PIF pointer in FIG. 7*a*, while filter 2 will match the transport protocol HTTP and invoke PIF number 2. Assume that an incoming packet is a WAP-packet leading to a match for WSP. PIF 1 now employs an identifier data in the PIF configuration, in this case the URL/URI. In this example, it checks for the domain names of the MMS-centers of the operator. If the packet's WSP-header contains any of these domain names the resulting service class is 14. If the packet contains any other URL (the wild card *), the packet is non-MMS WAP traffic and is classified as service class 15.

Referring back to FIG. 7*a*, the service filter with the service identifier 3 is set to match the subnet 100.12.0.0, which for example is a partner service provider. All packets to and from that service provider will be classified as service class 22. Finally, packets matching the wildcard rule, service filter with service identifier 4, representing "other traffic", will be classified as service class 60.

User Profile and User Service Class Vector

Figure 6:
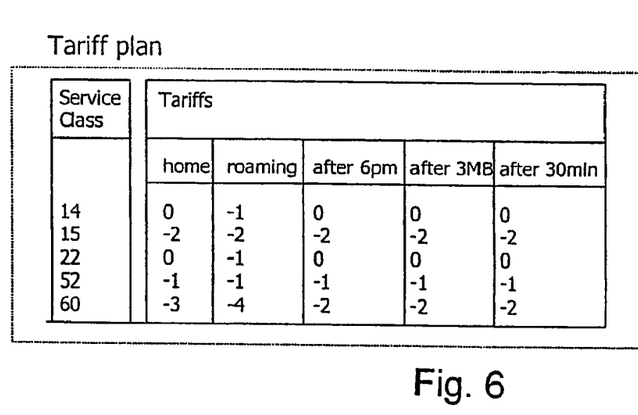
FIG. 6 illustrates the tariff plan schematically.

A user profile which is illustrated in FIG. 6 includes a subscriber identifier, the MSISDN, together with a user service class vector according to the present invention. The user service class vector is a list of the services the user is allowed to use.

Specifically, if the operator wishes to perform operator-side service authorisation, the user service class vectors may be used to control which service classes a subscriber is allowed to access. The user service class vectors are provisioned through a service authorisation and subscriber provisioning system. This allows for self-provisioning via the subscriber portal, which also forms the basis for top-up pages. Note, if the operator does not want to employ service authorisation all available service classes should be listed in the user service class vector.

Figure 5:
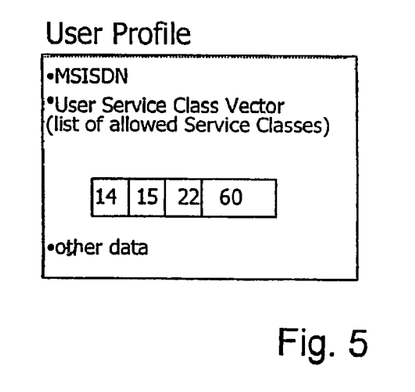
FIG. 5 illustrates the user profile schematically.

Continuing with the example described in conjunction with FIGS. 7*a* and 7*b*, the user profile in FIG. 5, allows the user to access service classes 14 (MMS traffic), 15 (other WAP traffic), 22 (the partner service provider), and 60 other traffic (general Internet access). The user profiles are managed by a customer relation management system and may be stored in a common directory. Independent of where the user profiles are stored they are replicated down to the rating engine according to the present invention.

Referring back again to the example in previous sections, FIG. 6 shows a simplified tariff plan where service class 14 (MMS traffic) is zero-rated except when the subscriber is roaming, Service Class 15 (other WAP-traffic) is rated −2 tokens per byte. Traffic to and from the partner service provider (Service Class 22) is free-of-charge except when roaming. These rating dimensions are independent and can be combined, so that a specific rate would apply, for example, between 6 pm and 6 am, above 3 MBytes, when roaming. The tariff plan in FIG. 6 is only a schematic simplification of the method used by said rating engine of the present invention.

For each service class in the user service class vector, the dynamic pre-rating calculation generates five rating values: an "initial rate value", two "current rate values" and two "next rate values". Further information on the interaction between the tariff plan and the user service class vector is explained below. The initial rate value is equal to the number of tokens that should be deducted when either a service class is used for the first time or for the first used service class depending on a configuration value for that subscriber. Thus, the initial fee may be based on service or subscriber.

To handle different settings of the meaning of "first time" e.g. per day or month, the information of the application of the "initial rate values" to be used for the next dynamic pre-rating calculation is supplied to the rating engine. The "current rate values" is the number of tokens per byte to be charged for packets belonging to a service class that shall be used immediately. See validity conditions below. The reason to have two "current rate values" is to allow different rating values for uplink and downlink traffic, respectively. The "next rate values" shall be used after the expiration of the "current rate values". The purpose of the "next rate values" is to manage mass updates at a certain time. I.e., the charging policy for a huge amount of users does not need to be updated at the same time which would cause extensive signalling during a short limited period of time for the huge amount of users, but the update may be performed during a longer period of time which reduces the signalling load per time unit during that limited period.

All these rating values of the charging policy 400 are listed per service class to form the user rating table 401 as shown in FIG. 4. The user rating table has a limited lifetime, specified by a set of validity conditions 402, which are calculated using the tariff thresholds for dimensions such as: roaming status (home or away), geographical location, Time-of-Day (ToD) including month, year, etc, aggregated volume which is also referred to as transfer history, aggregated connect time, QoS of the connection, i.e. of the PDP Context for a GPRS or UMTS connection. It is the responsibility of the serving element to request an updated user rating table when a threshold associated to a volume/time/location is reached. Thus, the charging system uses historical and/or current user specific usage data.

The system of the present invention is adapted to support service-based charging referred to as "one-time initial charge". An example of a service that is charged according the "one-time initial charge"-principle is a subscription of a newspaper. It may e.g. cost a fixed amount per month to be able to read the subscribed newspaper. In addition to the fixed subscription fee, a volume or time based fee may also be applied. The "one-time initial charge" is supported in two ways by the system of the present invention:

First by the service class. For each service class in the subscriber's user service class vector, the arrival of the first packet classified to that service class implies a deduction of the initial rate value from the token bucket. The serving element then puts zero into the initial rate value for that specific service class.

Secondly by the subscriber. All service classes in the subscriber's user service class vector have the same one time initial charge value. When a packet arrives for any of the service classes included in the user service class vector, the token bucket is decreased with that value and all values are set to zero. The initial rate value is reported as used to the rating engine, which then is arranged to give a zero initial rate value at subsequent requests.

For location-dependent rating, the packet forwarding system sends location information to the control system. As an example, the GGSN supports both forwarding of the SGSN IP address and an interface to a Location Enabled Server. The packet forwarding system is thus arranged to check the validity condition concerning geographical location and request a new user rating table in case the condition is no longer satisfied.

For time dependent rating the serving element supervises the validity time condition and requests a new user rating table when a predefined threshold is passed. In addition, the serving element supports maximum time subscriptions, i.e., connection up to 24 hours with one fee. This is managed by the remaining time validity condition, the serving element comprises means for down counting this value and if reaching zero or a predefined threshold, a new user rating table is requested. If a de-activation of the current connection, e.g. a PDP context de-activation, occurs before the value has become zero or the predefined threshold is reached, the value is sent to the rating engine which is adapted to then update the aggregated time for that user.

For volume dependent rating the serving element supervises the validity volume condition and requests a new user rating table when a predefined threshold is passed. The serving element decreases this value with the amount of traffic that passes and if reaching zero or the predefined threshold a new user rating table is requested. If a de-activation of the current connection, e.g. a PDP context de-activation, occurs before the value has become zero or the predefined threshold is reached the value is sent to the rating engine which is adapted to update the aggregated volume for that subscriber.

The control system and the serving element are respectively central units of the present invention. The control system is responsible for calculating the charging policy and providing the charging enforcement point of the serving element with that charging policy. The control system is further responsible for managing the credit account of one or more subscribers. The serving element comprises a charging enforcement point that is responsible for performing the charging based on the charging policy received from the control system. Moreover, the serving element comprises a token bucket adapted to store credit reservations for a plurality of services per user. The token bucket is arranged to communicate with the credit account function of the control system. Several different implementations of the control system and the serving element respectively are possible as will be apparent to the person skilled in the art. It will be apparent to the person skilled in the art how the control system and the serving element respectively and other functions of the present invention may be implemented using known hardware and software means. The control system and the serving element are according to the present invention implemented to be programmable. The easiest way of implementing the programmable control system and the packet forwarding system may be by means of software means, but programmable hardware implementations are also possible as well as implementations of combinations of hardware and software.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A charging system in a packet switched network for charging packets differently dependent on which service flow the packets belong to, the charging system comprising:
   a control system and a serving element associated with a packet forwarding system wherein said control system comprises:
     an account function for managing an account of at least one user, and
     a charging policy decision point for calculating a different charging policy for each of a plurality of allowed services for the at least one user,
   wherein said serving element comprises:
     a token bucket associated with the at least one user, said token bucket for storing reservations for a plurality of service flows received from the account function of the at least one user, and
     a charging policy enforcement point for performing charging for the plurality of service flows by reducing the stored reservation of the token bucket according to the calculated charging policies.

2. The charging system according to claim 1 wherein the charging policy enforcement point includes means for calculating the charging policies based on historical and/or current user specific usage data.

3. The charging system according to claim 1 wherein the serving element comprises means for classifying the services into different service classes based on the tariff plan of the services.

4. The charging system according to claim 3 wherein the allowed subscriber service classes are stored in a Service Class Vector.

5. The charging system according to claim 1 wherein the packet forwarding system is a Gateway GPRS Support Node in a mobile telecommunication network.

6. A charging system in a packet switched network for charging packets differently dependent on which service flow the packets belong to, the charging system comprising:
   a control system and a serving element associated with a packet forwarding system, wherein said control system comprises:
     an account function adapted to manage an account of at least one user, and
     a charging policy decision point arranged to calculate a charging policy for allowed services for the at least one user, wherein the calculated charging policy comprises at least one user rating table and a set of validity conditions,
   wherein said serving element comprises:
     a token bucket adapted to store reservations received from the account function of a user associated with the token bucket, and
     a charging policy enforcement point arranged to perform charging for a plurality of the allowed services by reducing the stored reservation of the token bucket according to the calculated charging policy.

7. The charging system according to claim 6 wherein the set of validity conditions defines the lifetime of the at least one user rating table.

8. The charging system according to claim 6 wherein the charging policy enforcement point includes at least two user rating tables having different time validity conditions.

9. A charging system in a packet switched network for charging packets differently dependent on which service flow the packets belong to, the charging system comprising:
   a control system and a serving element associated with a packet forwarding system, wherein said control system comprises:
     an account function adapted to manage an account of at least one user, and
     a charging policy decision point arranged to calculate a charging policy for allowed services for the at least one user,
   wherein said serving element comprises:
     a token bucket adapted to store reservations received from the account function of a user associated with the token bucket,
     a charging policy enforcement point arranged to perform charging for a plurality of the allowed services by reducing the stored reservation of the token bucket according to the calculated charging policy, and
     means for classifying the services into different service classes, said classifying means including a service filter adapted to identify the different service flows.

10. The charging system according to claim 9 wherein the means for classifying the services into different service classes further comprises Protocol Inspection Filters adapted to identify the different service flows, when the service filter is not capable of said identification.

11. A control system of a charging system in a packet switched network, said control system comprising:
an account function for managing an account of at least one user; and
a charging policy decision point for calculating charging policies for a plurality of allowed services for the at least one user, wherein the charging policies are utilized to calculate charges for a plurality of service flows using a single token bucket.

12. The control system according to claim 11 wherein the charging policies are calculated based on historical and/or current user specific usage data.

13. The control system according to claim 11 wherein the control system is implemented in a mobile telecommunication network.

14. A control system of a charging system in a packet switched network, said control system comprising:
an account function for managing an account of at least one user; and
a charging policy decision point for calculating a charging policy for the allowed services for the at least one user;
wherein the calculated charging policy includes:
at least one user rating table, and
a set of validity conditions.

15. The control system according to claim 14 wherein the set of validity conditions defines the lifetime of the at least one user rating table.

16. The control system according to claim 14 wherein the calculated charging policy comprises at least two user rating tables having different time validity conditions.

17. A serving element residing in a packet forwarding system of a charging system in a packet switched network, said serving element comprising:
means for receiving reservations for at least one user,
a token bucket for storing the reservations for the user associated with the token bucket,
means for receiving a charging policy for allowed services, and
a charging policy enforcement point for charging for a plurality of the allowed services by reducing the stored reservation of the token bucket according to a received calculated charging policy.

18. The serving element according to claim 17 further comprising a single token bucket per user.

19. The serving element according to claim 17 further comprising means for classifying the services into different service classes based on the tariff plan of the services.

20. The serving element according to claim 19 wherein the allowed subscriber service classes are stored in a Service Class Vector.

21. The serving element according to claim 19 wherein the packet forwarding system is a Gateway GPRS Support Node in a mobile telecommunication network.

22. A serving element residing in a packet forwarding system of a charging system in a packet switched network, said serving element comprising:
means for receiving reservations for at least one user,
a token bucket for storing the reservations for the user associated with the token bucket,
means for receiving a charging policy for allowed services, wherein the charging policy includes at least one user rating table and a set of validity conditions, and
a charging policy enforcement point for charging for a plurality of the allowed services by reducing the stored reservation of the token bucket according to a received calculated charging policy.

23. The serving element according to claim 22 wherein the charging policy is calculated based on historical and/or current user specific usage data.

24. The serving element according to claim 22 wherein the set of validity conditions defines the lifetime of the at least one user rating table.

25. The serving element according to claim 22 wherein the charging policy comprises at least two user rating tables having different time validity conditions.

26. A serving element residing in a packet forwarding system of a charging system in a packet switched network, said serving element comprising:
means for receiving reservations for at least one user,
a token bucket for storing the reservations for the user associated with the token bucket,
means for classifying the services into different service classes based on the tariff plan of the services, wherein the means for classifying the services into different service classes includes a service filter adapted to identify different service flows,
means for receiving a charging policy for allowed services, and
a charging policy enforcement point for charging for a plurality of the allowed services by reducing the stored reservation of the token bucket according to a received calculated charging policy.

27. The serving element according to claim 26 wherein the means for classifying the services into different service classes further comprises Protocol Inspection Filters adapted to identify the different service flows, when the service filter is not capable of said identification.

* * * * *